United States Patent [19]

Somlo et al.

[11] 3,914,263
[45] Oct. 21, 1975

[54] TETRAHYDROANTHRAQUINONE OXIMES AND PROCESS FOR THEIR PREPARATION

[75] Inventors: Tibor Somlo, Birsfelden; James Murphy, Riehen, both of Switzerland

[73] Assignee: Ciba-Geigy AG, Basel, Switzerland

[22] Filed: Mar. 13, 1974

[21] Appl. No.: 450,913

[30] Foreign Application Priority Data
Mar. 22, 1973 Switzerland.................. 4170/73

[52] U.S. Cl............................... 260/351; 260/369
[51] Int. Cl.$^2$........................................ C07C 49/64
[58] Field of Search.................. 260/566 A, 351

[56] References Cited
UNITED STATES PATENTS
3,538,126 11/1970 Lange et al.................. 260/351

OTHER PUBLICATIONS
Butz et al., Organic Reactions Vol. v pp. 150-153, 157-159 and 161-192 (1962).
Kittila, "Dimethylformamide Chemical uses" pp viii and ix (1967).
"Dimethyl Sulfoxide Technical Bulletin" Crown Zellerbach Corp. Pg. 1 (1966).
Beilstein's Handbuck der Organischen Chemie Vol. 7, third suppl. (1969) pp. 3774-3775 and 3778-3779.

*Primary Examiner*—Gerald A. Schwartz
*Attorney, Agent, or Firm*—Joseph G. Kolodny; Prabodh I. Almaula; Edward McC. Roberts

[57] ABSTRACT

The present invention provides new tetrahydroanthraquinone oximes of the formula

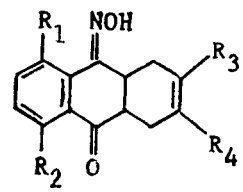

wherein $R_1$ and $R_2$ each independently represents hydrogen, chlorine or nitro, and $R_3$ and $R_4$ each independently represents hydrogen, chlorine or methyl, and a process for their manufacture, wherein butadiene or a butadiene compound that is substituted by chlorine, methyl, hydroxyl, lower alkoxy or lower dialkylamine, is additively combined in an aprotic, polar solvent with a naphthoquinone oxime of the formula

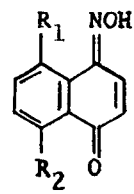

The new compounds are valuable intermediates for dyes and pigments.

2 Claims, No Drawings

TETRAHYDROANTHRAQUINONE OXIMES AND PROCESS FOR THEIR PREPARATION

The present invention relates to new tetrahydroanthraquinone oximes, to a process for the manufacture of these compounds and their use as intermediates for dyes and pigments as well as to the manufacture of corresponding anthraquinone compounds.

The new tetrahydroanthraquinone oximes have the formula

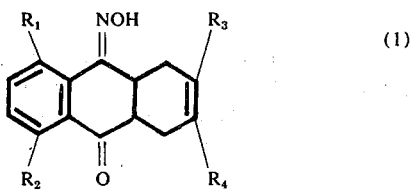

wherein $R_1$ and $R_2$ each independently represents hydrogen, chlorine or nitro, and $R_3$ and $R_4$ each independently represents hydrogen, chlorine or methyl.

Tetrahydroanthraquinone oximes of particular industrial importance have the formula

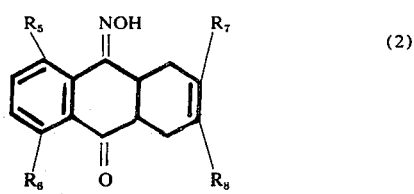

wherein one of the symbols $R_5$ and $R_6$ represents nitro and the other represents hydrogen and $R_7$ and $R_8$ represent hydrogen or methyl.

The invention further provides a process for the manufacture of the compounds of the formula (1), wherein butadiene or a butadiene compound that is substituted by chlorine, methyl, hydroxyl, lower alkoxy or lower dialkylamine, is additively combined in an aprotic, polar solvent with a naphthoquinone oxime of the formula

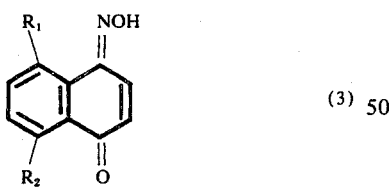

wherein $R_1$ and $R_2$ have the indicated meaning. The naphthoquinone oximes of the formula (3) are manufactured e.g. by treating optionally substituted nitronaphthalenes with fuming sulphuric acid or with aqueous methanol/sodium hydroxide solution according to the methods described in German Pat. No. 90 414 or in Chemical Abstracts, Vol. 53, 21836 f.

As examples of napththoquinone oximes that can be used according to the invention there may be cited herein:

1,4-naphthoquinone-1-oxime, 5-nitro-1,4-naphthoquinone-1-oxime or 8-nitro-1,4-naphthoquinone-1-oxime, 5-chloro-8-nitro-1,4-naphthoquinone-1-oxime, 5,8-dichloro-1,4-naphthoquinone-1-oxime.

Particularly suitable are 5-nitro-1,4-naphthoquinone-1-oxime and 8-nitro-1,4-naphthoquinone-1-oxime, which can also be used as isomeric mixture.

Suitable diene compounds are preferably 1,3-butadiene or 1,3-butadienes that are substituted by chlorine or methyl and 1,3-butadienes that are substituted in 1-position by hydroxyl, lower alkoxy or lower alkylamino, the alkyl and alkoxy groups or moieties containing preferably from 1 to 3 carbon atoms.

Examples of such substituted 1,3-butadiene compounds are: isoprene, 2,3-dimethyl-butadiene, 1-methoxy-butadiene or 2-methoxy-butadiene, 1-chloro-butadiene or 2-chloro-butadiene (Chloropren), 1-hydroxybutadiene (Crotonaldehyde), 1-dimethylamino-butadiene.

The reaction according to the invention takes place accordingly in an aprotic, polar solvent and the reactants are used in equivalent amounts or a surplus of the diene compound is used.

The aprotic, polar solvents are compounds that, under the reaction conditions, are unable to split off hydrogen as proton. Examples of suitable aprotic, polar solvents are: amides of lower fatty acids, e.g. dimethyl formamide and dimethyl acetamide, dimethyl sulphoxide, tetramethyl urea, tetramethylene sulphone, hexamethylphosphoric triamide, nitrobenzene and N-methylpyrrolidone, and mixtures thereof. Preferred solvents are dimethyl sulphoxide and dimethyl formamide.

The reaction temperature can vary within wide limits and depends primarily on the reactants used. Ordinarily, it is between 20°C and 150°C and at an atmospheric pressure of up to 50 gauge pressure. It is preferred that the reaction be carried out at a temperature between 80°C and 130°C. Depending on the starting material and the reaction temperature, the reaction time is from a few minutes to several hours.

The use of butadiene compounds that are substituted in 1-position by hydroxy, alkoxy or dialkylamine in the process according to the invention leads direct to the obtention of the compounds of the formula (1) because the cited substituents in the 1-position can be readily split off.

The compounds of the formula (2) are manufactured by reacting with advantage butadiene or a butadiene that is substituted by methyl or dialkyl (1-3C) amino with a naphthoquinone oxime of the formula

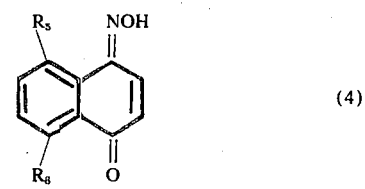

wherein $R_5$ and $R_6$ have the indicated meaning.

The diene addition according to the invention can be carried out in simple manner and with inexpensive means on a large scale and provides ordinarily very good yields between 75 and 100 %.

Up till now, no Diels-Alder reactions have been known wherein a quinoxime and, in particular, a naphthoquinoxime, is used as dienophile. Naphthoquinoximes have long been known, e.g. from German Pat. No. 90,414, and the Diels-Alder reactions with naphthoquinones have been exhaustively investigated. This circumstance is due to the fact that the naphthoquinone oximes of the formula (5) also exist in their tautomeric forms as nitrosohydroxy compounds of the following formula (5a).

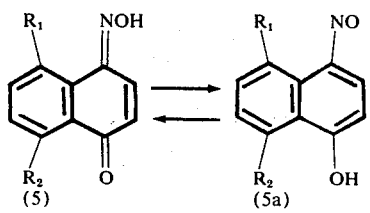

These latter are not dienophiles and cannot therefore particupate in the Diels-Alder additions.

The surprising observation has now been made that the use of an organic, aprotic, polar solvent causes the naphtho compounds used as starting materials to behave as dienophiles, so that the process according to the invention proceeds under mild conditions and with excellent yields.

The new tetrahydroanthraquinone oximes are valuable intermediates for dyes and pigments. They can also be used for the manufacture of anthraquinone dyes, since it is possible to convert them easily into corresponding anthroquinone derivatives. Tetrahydroanthraquinone oximes substituted in the 1-position according to the present invention and which are obtained e.g. by addition of 1-hydroxy-, 1-alkoxy- or 1-dialkylamino-butadienes, can be converted direct under their conditions of manufacture into corresponding anthraquinone compounds. On the other hand, differently substituted tetrahydroanthraquinone oximes are converted into the corresponding anthraquinone derivatives by applying other conditions. For example, tetrahydroanthraquinone oximes can be converted into corresponding nitroanthraquinone compounds by treating them with sodium hypochlorite solution in lower alcohols, e.g. isopropanol or butanol, at boiling temperature. Further, it is possible to reduce e.g. 8-nitro-tetrahydroanthraquinone oximes by catalytic hydrogenation with palladium-on-charcoal catalyst to 1,-9-diamino-10-hydroxy-anthracene, and then to oxidise this with ferric chloride to 1-aminoanthraquinone. The important dyestuff intermediate, 1-anthraquinone, is obtained easily by reduction of 8-nitrotetrahydroanthraquinone oxime, e.g. with hydrazine, to 8-nitro-9-amino-10-hydroxyanthracene and subsequent oxidation with customary oxidants, e.g. potassium permanganate.

The following Examples describe the invention in more detail but in no wise limit it. Parts and percentages are by weight.

EXAMPLE 1

1,4,11,12-tetrahydro-8-nitro-anthraquinone-10-oxime 10.9 g of 8-nitro-1,4-naphthoquinone-1-oxime, 60 g of dimethyl sulphoxide, and 100 g of butadiene are heated in an autoclave to 90°C and stirred for 20 hours at this temperature, Maximum pressure: 32 atmospheres gauge pressure. The reaction mixture is subsequently poured on ice, the precipitate is filtered off and dried to yield 12 g of tetrahydronitroanthraquinone oxime of the formula

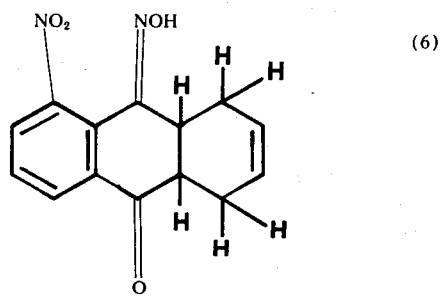

Recrystallisation from 50 % ethanol yields analytically pure product with a melting point of 200°C.

Boiling the product with sodium hypochlorite solution in butanol yields 1-nitroanthraquinone of the formula

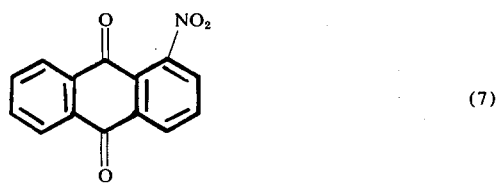

EXAMPLE 2

By carrying out the butadiene addition as in Example 1, but with a mixture of 8-nitro-1,4-naphthoquinone-1-oxime and 5-nitro-1,4-naphthoquinone-1-oxime, there is obtained a mixture of the corresponding isomeric 1,-4,11,12-tetrahydro-nitroanthraquinone oximes. Boiling the resulting mixture with sodium hypochlorite solution in butanol yields exclusively 1-nitroanthraquinone.

EXAMPLE 3

1,4,11,12-tetrahydro-2,3-dimethyl-8-nitro-anthraquinone-10-oxime 2.2 g of 8-nitro-1,4-naphthoquinone-1-oxime, 10 g of dimethyl formamide and 2.4 g of 2,3-dimethyl-butadiene are stirred for 16 hours at 80°C and for a further 4 hours at 100°C. The dimethyl butadiene surplus is then removed by distillation and the reaction solution is poured on 200 ml of water. The precipitated product is filtered off, dried, and crystallised from 50 % ethanol. The resulting product of the formula

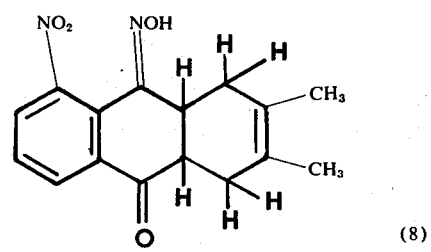

has a melting point of 205°C.

EXAMPLE 4

10.9 g of 8-nitro-1,4-naphthoquinone-1-oxime, 12.6 g of 1 N,N-diethyl-amino-1,3-butadiene (boiling point 62°C/14 mm Hg) and 100 g of dimethyl sulphoxide are stirred for 5 hours at 100°C. The mixture is then poured on 1000 ml of water. The precipitated tetrahydroanthraquinone oxime is filtered off and dissolved in sulphuric acid. The sulhpuric acid solution is treated with water and afterwards the resulting crystals are filtered off and dried.

Recrystallisation from glacial acetic acid yields a pure product that melts at 210° to 220°C and constitutes 1-nitroanthraquinone.

We claim:
1. Tetrahydroanthraquinone oximes of the formula

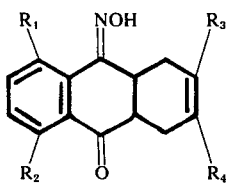

wherein $R_1$ and $R_2$ each independently represents hydrogen, chlorine, or nitro, and $R_3$ and $R_4$ each independently represents hydrogen, chlorine or methyl.

2. Tetrahydroanthraquinone oximes according to claim 1, of the formula

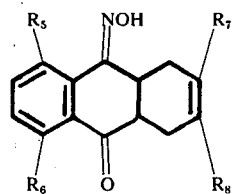

wherein one of the symbols $R_5$ and $R_6$ represents nitro and the other represents hydrogen, and $R_7$ and $R_8$ represent hydrogen or methyl.

* * * * *